United States Patent [19]

Wlodarczyk et al.

[11] Patent Number: 4,788,408

[45] Date of Patent: Nov. 29, 1988

[54] ARC DEVICE WITH ADJUSTABLE CATHODE

[75] Inventors: Janusz Wlodarczyk, Jackson Heights; Henry C. Thompson, Huntington Bay; Thomas F. Bernecki, Elmont; Henry A. Budke, Kings Park, all of N.Y.

[73] Assignee: The Perkin-Elmer Corporation, Norwalk, Conn.

[21] Appl. No.: 47,757

[22] Filed: May 8, 1987

[51] Int. Cl.[4] .................................................. B23K 9/00

[52] U.S. Cl. ......................... 219/121.49; 219/121 PT; 219/121 PW; 219/121 PM; 219/75; 219/121 PR; 219/124.03; 219/121.52; 219/121.54; 219/121.57; 219/121.48

[58] Field of Search ....................... 219/74, 75, 124.01, 219/124.02, 124.03, 121 PN, 121 P, 121 PM, 121 PP, 121 PQ, 121 PR, 121 PT, 121 PW, 137.62; 313/231.21, 231.31, 231.41; 315/111.31, 111.21, 111.41

[56] References Cited

U.S. PATENT DOCUMENTS 2,960,594 11/1960 Thorpe ......................... 219/121 PR
3,242,305 3/1966 Kane et al. ............................ 219/75
3,558,973 1/1971 Pochert ....................... 219/121 PW
4,650,956 3/1987 Marhic et al. ................ 219/121 PR
4,692,584 9/1987 Caneer, Jr. .................. 219/121 PR
4,701,590 10/1987 Hutch .......................... 219/121 PR

*Primary Examiner*—M. H. Paschall
*Attorney, Agent, or Firm*—H. S. Ingham; F. L. Masselle; E. T. Grimes

[57] ABSTRACT

An arc plasma generating system includes components for adjusting spacing between the cathode and the anode. A piston affixed to the cathode is slidingly positioned in a cylinder partitioning therein a first chamber and a second chamber. The first chamber is receptive of discharged cooling fluid at reduced pressure. A first valve selectively infuses pressurized control fluid into the second chamber such as to move the piston against the reduced pressure and thereby move the cathode axially in a first direction. A second valve selectively discharges the control fluid from the second chamber such that the reduced pressure in the first chamber moves the piston opposite the first direction. Telescoping tubing affixed between the piston and the end wall of the cylinder is located within the cylinder and conveys cooling fluid to the cathode. A flexible electrical cable connected between the cathode and a source of arc current is located within the cylinder member such as to be cooled by fluid therein.

7 Claims, 1 Drawing Sheet

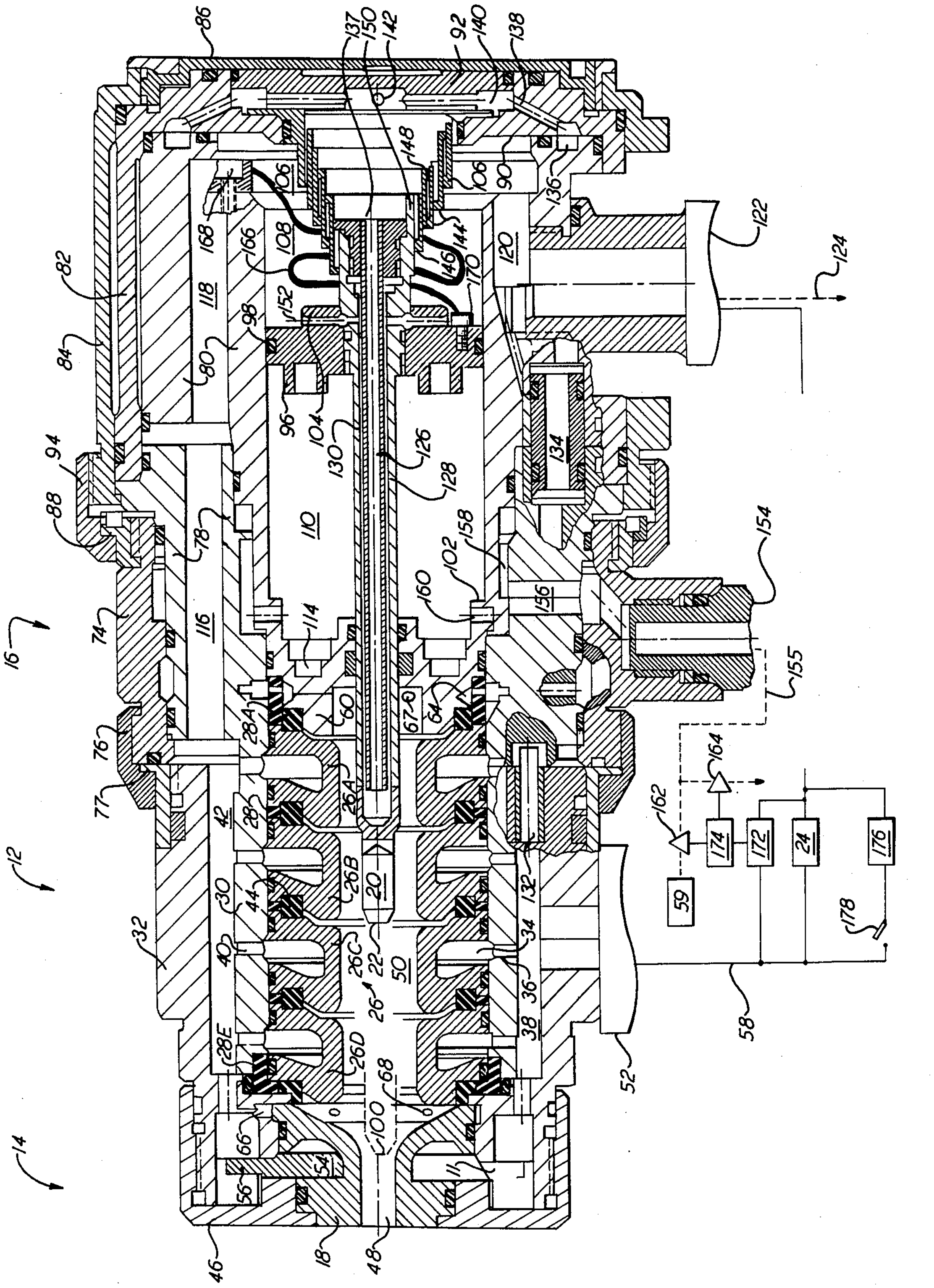
86
137
150
142
92
140
138
106
148
106
90
136
122
124
82
168
166
108
118
144
146
170
120
84
80
98
152
104
96
130
126
128
134
94
88
78
110
158
102
160
114
116
156
154
16
74
155
60
67
64
28A
26A
76
164
77
162
42
28
12
174
172
24
176
20
26B
132
59
30
44
40
22
34
32
50
178
36
26C
26
38
58
28E
26D
52
68
100
66
54
14
56
11
46
18
48

ARC DEVICE WITH ADJUSTABLE CATHODE

This invention generally relates to an arc device such as a plasma gun, and particularly to a mechanism for an axially adjustable cathode.

BACKGROUND OF THE INVENTION

Arc devices such as plasma guns are utilized for such purposes as themal spraying which involves the heat softening of a heat fusible material, such as a metal or ceramic, and propelling the softened material in particulate form against a surface to be coated. In typical plasma systems an electric arc is created between a water cooled nozzle (anode) and a centrally located cathode. An inert gas passes through the electric arc and is excited thereby to temperature of up to 15,000 degrees Centigrade. The plasma of at least partially ionized gas issuing from the nozzle resembles an open oxy-acetylene flame.

In copending patent application Ser. No. 021,958 filed Mar. 5, 1987, assigned to the same assignee as the present application, a plasma generating system comprises a plasma gun including a hollow cylindrical anode member, a hollow cylindrical intermediate member electrically isolated from and juxtaposed coaxially with the anode member to form a plasma-forming gas passage through the intermediate member and the anode member, and an axially movable cathode member. An electric motor or pneumatic piston responsive to a measuement of arc voltage continually adjusts the axial position of the cathode tip relative to the anode nozzle so as to maintain a predetermined arc voltage.

This system with adjustment of the cathode according to voltage has proven itself to provide a substantial improvement in arc gun performance. The electric motor and pneumatic piston arrangements disclosed in the copending patent application, are operatively very efficient. However, they are somewhat bulky, heavy and complex or require separate utility (compressed air).

U.S. Pat. No. 3,242,305 discloses a retract starting plasma torch in which starting of the arc is accomplished by a spring urging an electrode against the nozzle. Retraction to a fixed operating position is effected by the fluid pressure of the cooling water acting against the spring when the arc is started.

In view of the foregoing an object of the present invention is to provide an improved arc device with an adjustable cathode position relative to the anode.

A further object is to provide a novel cathode adjustment mechanism utilizing the cooling fluid for the arc device.

BRIEF DESCRIPTION OF THE INVENTION

The foregoing and other objects are achieved in an arc generating system such as a plasma gun, including an arc device with a cathode member located in spaced relationship with an anode operable to maintain an arc therebetween. Fluid passage means are receptive of pressurized input cooling fluid for cooling the arc device. The fluid passage means have discharge means for discharging the cooling fluid at an intermediate pressure, lower than the input pressure. According to the present invention cathode positioning means for adjusting relative axial spacing between the cathode member and the anode comprises a closed cylinder member extending from the arc device. A piston is affixed to the cathode member and is slidingly positioned in the cylinder member partitioning therein a first chamber and a second chamber.

The first chamber is receptive of the cooling fluid from the anode outlet passage and has exit means of sufficient resistance to maintain the cooling fluid in the first chamber at the intermediate pressure. A first valve means is operable to selectively infuse pressurized liquid control fluid into the second chamber such as to move the piston against the intermediate pressure of the cooling fluid in the first chamber and thereby move the cathode member axially in a first direction with respect to the anode. A second valve means is operable for selectively discharging the control fluid from the second chamber such that the intermediate pressure of the cooling fluid in the first chamber moves the piston against the discharging control fluid in the second chamber and thereby moves the cathode member axilly in a second direction opposite the first direction.

In a preferred embodiment the fluid passage means includes cathode cooling means with a fluid inlet located within the cylinder member and an outlet passage for discharging the cooling fluid at the intermediate pressure into the first chamber. The cylinder member is bounded at an end opposite the arc device by an end wall having therein a fluid passage receptive of the pressurized cooling fluid. Extendable ducting means, preferably comprising telescoping tubing affixed between the piston and the end wall, are located within the cylinder member and are receptive of the pressurized cooling fluid for conveying the pressurized cooling fluid to the fluid inlet.

Desirably a flexible electrical cable is connected between the cathode member and a source of arc current and is located within the cylinder member such as to be cooled by fluid therein.

For a preferred mode of operation, for example where the arc device is a plasma gun, the cathode positioning means further comprises voltage determining means for measuring an arc voltage between the cathode member and the anode member. Control means communicate with the voltage determining means for selectively controlling the first valve and the second valve such as to adjust relative spacing between the cathode member and the anode member so as to maintain a predetermined arc voltage.

BRIEF DESCRIPTION OF THE DRAWING

The drawing is a longitudinal sectional view of a plasma gun incorporating the present invention.

DETAILED DESCRIPTION OF THE INVENTION

As an example for incorporating the present invention a plasma gun is of the type disclosed in the aforementioned copending patent application and is illustrated in the drawing. For such a plasma gun there are broadly three component assemblies, namely a gun body assembly 12, a nozzle assembly 14 and a cathode assembly 16. Appropriate O-rings (not numbered) are strategically placed in and between the assemblies to seal gas and other fluid passages. The nozzle assembly includes a tubular nozzle member 18 constituting an anode. The cathode assembly includes a cathode member 20 that is located coaxially in spaced relationship with the nozzle such as to maintain a plasma generating arc between the cathode tip 22 and the anode in the presence of a stream of plasma-forming gas and a DC voltage. An arc power source is shown schematically at 24. The anode and cathode are of conventional materials such as copper and tungsten respectively.

Gun body assembly 12 constitutes the central portion of the gun, excluding cathode member 20. Assembly 12 includes, in the present example, an intermediate member 26.

Member 26 is formed of four tubular segments 26A, 26B, 26C, 26D made of copper which are stacked between insulating spacing rings 28 and closely fitted into an insulator tube 30 which is held in a metallic gun body 32. A similar but wider spacing ring 28A is engaged on the rearward side of rear segment 26A, and another ring 28E between nozzle member 18 and adjacent segment 26D. (The letters A, B, C, D, E used with component numbers herein indicate, respectively, the rear, rear-central, forward-central, forward and forward-most component. Also, as used herein and in the claims, the term "forward" and terms derived therefrom or synonymous or analogous thereto, have reference to the end from which the plasma flame issues from the gun; similarly "rearward", etc., denote the opposite location.)

The insulator tube 30 is formed, for example, of glass filled Delrin TM. The rims of segments 26 have O-ring seals (not numbered) in the circumference to seal annular channels 34 in segments 26 against insulator tube 30. Coolant to annular channels 32 in each segment is supplied through lateral ducts 36 in insulator tube 30 and a longitudinal duct 38 formed by a longitudinal slot on the outside of insulator tube 30. Coolant is removed from channels 32 through a second set of lateral ducts 40 diametrically opposite first ducts 38, thence through a second longitudinal duct (slot) 42 between tube 30 and body 32.

Spacing rings 28 are formed of a material such as polyimide plastic and each is juxtaposed in a slot between adjacent segments 26 for spacing the segments. Thermal barrier rings 44 formed of a ceramic material such as boron nitride are juxtaposed one each between each pair of adjacent segments radially inward of the corresponding spacing ring 28.

Anode nozzle 18 is held in the forward end of gun body 32 by a threaded retainer ring 46. A nozzle bore 48 and a gas passage 50 through the stacked segments 26 form the plasma-forming gas passage. Arc current is conducted from anode 18 through gun body 32 to a conventional current cable connector 52.

Nozzle 18 has an annular coolant channel 54 therein formed by a baffle 56, similar to those annular channels 34 in segments 26. Coolant is fed to channel 54 from longitudinal duct 38 which communicates with the conventional connector 52 for a coolant-carrying power cable 58 which carries input liquid fluid coolant (typically water) at high pressure from a source 59 as well as the anode current.

Rearward of the stacked segments 26 a gas distribution ring 60 is spaced axially from the rearward segment 26A by a barrier ring 44A that is similar to the other of rings 44 situated between segments. The forward part of distribution ring 60 has at least one gas inlet orifice 62 fed by a supply of gas via an annular manifold 64 and a laterally directed gas duct to a connection for plasma forming gas (not shown, the gas supply being conventional). Similarly a second supply of plasma forming gas may be introduced through a passage 66 and a plurality of outer orifices 68 in nozzle 18 for introducing the second gas into the forward part of gas passage 50.

Cathode assembly 16 includes rod-shaped cathode member 20 which has an anterior tip 22 and is attached at its posterior end to a cathode support rod 70. The support rod is slidably mounted with two o-rings 72 in distributoon ring 60 which serves as a support member to guide the support rod in its axial path.

An intermediate body 74 is attached to gun body 32 with a threaded intermediate ring 76 via a shoulder 77 on a first holding ring threaded to gun body 32. Body 74 encloses a rearward portion 78 of insulator tube 30. An elongated closed cylinder member 80 extends rearwardly of insulator tube 30 and is held in a rear body 82, body 82 being retained by an outer body 84 with a threaded rear retaining plate 86 threaded to an encircling ring 94 held to a shoulder 88 on a second holding ring threaded to intermediate ring 74. The rearward end of cylinder member 80 is closed by means of an end wall 90 formed outwardly by rear body 82 and inwardly by an end fitting 92 retained with rear plate 86. The forward end of cylinder 80 is bounded by gas distribution ring 60.

The rearward end of cathode support rod 70 is attached concentrically to a piston 96 which slides axially with an o-ring 98 within cylinder 80. The available length of the cylinder is sufficient for the piston to carry the support rod and cathode the desired range of distance. The maximum extended position (forwardly; shown at 100 for the cathode member) is established by piston 96 resting against shoulder 102 of the distribution ring. The maximum retracted position (rearwardly) is established by contact between a rearward protrusion 104 of the piston and a forwardly extending tubular portion 106 of end fitting 92. A first, rearward chamber 108 is formed between piston 96 and wall 90. A second, forward chamber 110 is formed between the piston and distribution ring 60. An annular space 112 outside tubular portion 106 provides for some remaining volume to the rearward chamber for the maximum retracted position; for similar reason an annular groove 114 is in the rear of distribution ring 60 for the forward chamber.

Coolant exiting from nozzle member 18 and intermediate member 26 is directed through second longitudinal duct 42 in insulator tube 30, thence through duct extension 116 in the insulator tube and a first rear duct 118 in cylinder member 80 which communicates with annular space 106 at end wall 90, and thus with rearward chamber 108. Due to the normal constrictions in the cooling ducts, the coolant entering chamber 108 is at a reduced pressure less than the input pressure.

A second rear duct 120 in cylinder member 80 carries fluid out of rearward chamber 108 to a conventional cable connection 122 for coolant and power for the cathode. A cable tube at 124 carries the coolant to a point of disposal such as a drain or to a recirculating pump inlet, in either case at a relatively low fluid pressure (for example zero). Some constriction exists in this cable system, optionally with a special constrictor (not shown), so that the fluid pressure in rearward chamber 108 is maintained at an intermediate level between the input pressure to the gun and the disposal pressure.

Cooling of cathode member 20 is provided by coaxial channels. An axial duct 126 extends from the rear of support rod 70 into cathode member 20. A long tube 128 is positioned axially in the duct forming an outer annular duct 130. The rearward end of duct 126 constitutes a fluid inlet 131 proximate piston 96 within cylinder 80.

Cooling fluid for cathode 20 is supplied from the same source as for anode 18. A rearwardly directed branch 132 from duct 38 communicates through an intermediate duct 134 in member 80 with annular passage 136 between cylinder member 80 and rear body 82. A plurality of small ducts 138 (two shown) in the rear body direct flow to a second annular passage 140 between end fitting 92 and rear body 82. At least one fluid passage 142 (three shown) carries the fluid towards the central axis of the end fitting. Connection from fluid passages 142 to fluid inlet 131 for cathode cooling is effected by extendable ducting, for example a flexible tube, within cylinder 80.

Conveniently, however, according to a preferred embodiment shown in the drawing, the extendable ducting is formed of telescoping tubing. A series of sequentially smaller tubular members 144, each with a forward inner rim 146 and a rearward outer rim 148 are fitted slidingly together concentrically. The tubular member portion 106 of end fitting 92, which also has a forward inner rim, constitutes the outer and rear member of the series. The forward and inner member 150 forms the rearward end of cathode support rod 70 and fluid inlet 131. When the cathode is fully extended the respective inner and outer rims 146,148 engage and thereby limit the extended (forward) position of the cathode. When the cathode is fully retracted the tubular members are fully meshed concentrically. In any position at these extremes or between the telescoping tubing conveys cooling fluid from fluid passages 142 in end fitting 92 to fluid inlet 131 for the cathode. Although the members 144 should slidingly mesh as tightly as practical, it is not necessary to provide completely fluid-tight seals therebetween for the operation described below since small leakage into the intermediate pressure chamber 108 is of no significant consequence.

At least one transverse orifice 152 (two shown) to the rear of piston 96 direct the exiting cathode coolant from outer annular duct 130 into rearward chamber 108 in the cylinder. The normal constrictions in ducts 126,128 cause the cathode coolant to exit at a reduced pressure less than the input pressure. Thus the exiting cathode coolant joins the cathode coolant at the intermediate fluid pressure in rearward chamber 108.

A second inlet for high pressure fluid is provided through a conventional hose fitting 154 and a hose 155 which, conveniently but not necessarily, is connected to the same source 59 as for the cooling fluid to the anode and cathode. A lateral channel 156 directs fluid to a manifold 158 outside member 80 and a plurality of radial channels 160 (two shown) then delivers the high pressure fluid to chamber 110 forward of piston 96. Two valves are in the supply line 155, desirably operated by solenoids. The first valve 162 in the hose line allows the fluid from source 59 to the forward chamber to be turned on and off. The second valve 164, connected between the first valve and fitting 154, may be opened to discharge fluid from the forward chamber (or return it for recirculation).

Positioning of cathode 20 is effected by the first and second valves 162,164 and the fluid associated therewith operates as a control fluid. Opening the first valve 162, with the second valve 164 closed, infuses high pressure fluid into forward chamber 110 and operates piston 96 against the fluid which is at intermediate pressure in the rearward chamber 108, moving the cathode rearwardly. With both valves closed there is no pressure imbalance on the piston since the liquid fluid is incompressible, so the piston and therefore the cathode member 20 remain in a fixed position. Then opening the second valve 164, with the first valve 162 remaining closed, allows the control fluid to discharge from forward chamber 110 from the force on the piston of the intermediate pressure of the fluid in the rearward chamber 108, moving the cathode forwardly.

Generally the high inlet pressure at duct 38 and into chamber 110 should be between 45 psi (3 bar) and 150 psi (10 bar), and constrictions in the gun and the fluid outlet should provide an intermediate pressure in the rearward chamber that is between 20% and 80% of the inlet pressure; e.g. the inlet pressure may be 75 psi (5 bar) and the intermediate pressure 58% of inlet.

It has been discovered that the arc current connection to the cathode is effected quite desirably by means of a flexible cable 166 positioned within the cylinder member in the rearward chamber, outside the telescoping tubing. One end of the cable is attached by a screw 168 to the rear wall of cylinder 80, the main cathode current cable fitting 122 being threaded into the cylinder for power connection. The other end of flexible cable 166 is attached by a second screw 170 to the rear face of the piston which connects electrically with the cathode. Since the cable is well cooled by being fully immersed in the fluid, relatively small gauge cable may be used. Generally the cable should be stranded and between 6 and 18 gauge (American wire standard); for example 9 gauge for carrying 1000 amperes. Such a cable is sufficiently flexible not to cause movement problems that standard size cable would introduce. Use of such cable eliminates the problems that are otherwise attendant to directing arc current to the cathode through the movement components.

For the embodiment utilizing the preferred plasma gun described herein, the position of cathode tip 22 is chosen in correspondence with a predetermined voltage for the arc. The actual voltage is measured across the anode and cathode, or across the arc power supply 24, as shown schematically at 172.

It is desirable, for process control purposes, to maintain a constant voltage. These results are achieved by determining the arc voltage and repositioning the cathode member as required to maintain the desired voltage. This is accomplished by moving the cathode member rearwardly with respect to the nozzle if the actual voltage is low, and forwardly if the voltage is high.

Preferably the solenoid valves 162,164 are electrically coupled to the voltage measuring system 172 through a controller 174 that is responsive to the voltage measurement such that a change in the arc voltage results in valve operation and a corresponding change in the axial position of the cathode tip 22. This is readily achieved in controller 174 with a conventional or desired comparative circuit that provides the difference between the arc voltage and a preset voltage of the desired level. When the difference exceeds a specified differential an electronic relay circuit is closed to send an adjusting current for moving the support rod forward or rearward according to whether the voltage difference is positive or negative. The adjusting current is sent to the corresponding solenoid. The result will be minute (or, if necessary, large) cathode adjustments as any voltage changes take place, for example, from erosion of the anode and/or cathode surfaces.

Generally the longer arc generated for steady state operation is difficult if not virtually impossible to initiate with application of the standard high frequency starting voltage. Therefore, with the embodiment described herein, the cathode member may be initially positioned in its extended position (dotted lines at 100) near the anode nozzle. This is automatically achieved when the cooling water is first turned on and valve 164 is opened (with valve 162 closed). The desired operating gas flows and the arc voltage source 24 are turned on, although no current will flow yet. Then, when a high frequency starting voltage 176 is momentarily applied in the normal manner (e.g., by closing switch 178) the arc will start and arc current will flow. When the arc has been started (and high frequency switch 178 opened) the cathode is then retracted to its operating position, indicated approximately by its location in the figure, by closing valve 164 and opening valve 162. These valve changes may be triggered automatically by an arc current sensor communicating through the controller. Thus, when the arc initiates, the system will determine that the voltage is too low (due to the short arc) and will immediately signal the valves means to retract the cathode to an operating position corresponding to the preset voltage condition. Computer control of the operations is quite desirable.

The arc current either may be preset so that the current assumes the desired value upon startup, or may be set initially at a low value and brought up after startup in the conventional manner or by electronic coordination with the voltage signal.

Powder feeding into the plasma for spraying may be accomplished in the conventional manner, if desired.

The apparatus of the present invention is operated generally with parameters of conventional plasma guns. Preferably the voltage is maintained at a set level between about 80 and 120 volts, the upper limit depending on power supply characteristics. Current may be up to about 1000 amperes, although care should be taken not to exceed a power level that depends on factors such as coolant flows, for example 80 KW. Internal dimensions are also conventional, except care must be taken that constrictions in the fluid passages are appropriate to maintain an intermediate fluid pressure as described herein above, as well as proper cooling.

Other variations of the present invention are anticipated. For example, it may be desirable to fix the gas distribution ring with respect to the cathode member in order to maintain the gas introduction at an optimum point with respect to the cathode tip, even as the tip is moved. Thus, in a further embodiment (not shown in the drawing), the axial movement of the cathode assembly in the gun also carries a parallel movement of the gas distribution ring. Within the spirit of the herein-described invention on an adjustably positioned cathode other configurations for an arc device may be used, for example a transferred arc device where a workpiece is the anode. Also the function of chambers 108,110 may be reversed; i.e., the rear chamber may receive the control fluid.

The apparatus of the present invention provides for simplified adjustment since only two valves are required. The components are relatively simple and light weight, and the system is particularly suitable for a light weight hand held gun or an extension type of plasma spray gun for entering small diameter openings. Because of simplicity and inherent cooling of the mechanisms, the apparatus is also especially suitable for use in low pressure chamber spraying.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. An arc generating system including an arc device with a cathode member located in spaced relationship with an anode operable to maintain an arc therebetween, fluid passage means receptive of pressurized liquid cooling fluid for cooling the arc device, discharge means for discharging the cooling fluid at an intermediate pressure, and cathode positioning means for adjusting relative axial spacing between the cathode member and the anode, the cathode positioning means comprising:

a closed cylinder member extending from the arc device;

a piston affixed to the cathode member and slidingly positioned in the cylinder member partitioning therein a first chamber and a second chamber, the first chamber being receptive of the cooling fluid from the discharge means and having an exit means of sufficient resistance to maintain the cooling fluid in the first chamber at the intermediate pressure;

first valve means for selectively infusing pressurized liquid control fluid into the second chamber such as to move the piston against the intermediate pressure of the cooling fluid in the first chamber and thereby move the cathode member in a first direction with respect to the anode; and second valve means for selectively discharging the control fluid from the second chamber such that the intermediate pressure of the cooling fluid in the first chamber moves the piston against the discharging control fluid in the second chamber and thereby moves the cathode member axially in a second direction opposite the first direction.

2. An arc generating system according to claim 1 wherein the fluid passage means includes cathode cooling means with a fluid inlet located within the cylinder member and with an outlet passage for discharging the cooling fluid at the intermediate pressure into the first chamber, and the cathode positioning means further comprises extendable ducting means located within the cylinder member receptive of the pressurized cooling fluid for conveying the pressurized cooling fluid to the fluid inlet.

3. An arc generating system according to claim 2 wherein the fluid inlet is disposed proximate the piston, the cylinder member is bounded at an end opposite the arc device by an end wall having therein a fluid passage receptive of the pressurized cooling fluid, and the extendable ducting means comprises telescoping tubing affixed between the piston and the end wall.

4. An arc generating system according to claim 1 wherein the cathode positioning means further comprises voltage determining means for measuring an arc voltage between the cathode member and the anode member, and control means communicating with the voltage determining means for selectively controlling the first valve means and the second valve means such as to adjust relative spacing between the cathode member and the anode member so as to maintain a predetermined arc voltage.

5. An arc generating system according to claim 1 wherein the cathode positioning means further comprises a flexible electrical cable connected between the cathode member and a source of arc current and located within the cylinder member such as to be cooled by fluid therein.

6. An arc generating system according to claim 1 wherein the second chamber is located on the side of the piston proximate the arc device, such that the cathode member is moved toward the anode member when the second valve means is discharging the control fluid from the second chamber, and the cathode member is moved away from the anode member when the first valve means is infusing pressurized control fluid into the second chamber.

7. A plasma generating system including a plasma gun with a tubular anode member, a rod-shaped cathode member located in spaced coaxial relationship with the anode member operable to maintain a plasma generating arc therebetween, anode fluid passage means receptive of pressurized cooling fluid for directing fluid to cool the anode member and having an anode outlet passage for discharging the cooling fluid from the anode fluid passage means at an intermediate pressure, cathode fluid passage means having a fluid inlet receptive of the pressurized cooling fluid for directing fluid to cool the cathode member and having a cathode outlet passage for discharging the cooling fluid from the cathode fluid passage at the intermediate pressure, and cathode positioning means for continually adjusting relative axial spacing between the cathode member and the anode member so as to maintain a predetermined arc voltage, the cathode positioning means comprising:

a closed cylinder member extending rearwardly from the plasma gun;

a piston affixed coaxially to the cathode member and slidingly positioned in the closed cylinder member partitioning therein a first chamber located on the side of the piston distal the plasma gun and a second chamber, the first chamber being receptive of the cooling fluid from the anode outlet passage and the cathode outlet passage and having an exit orifice of sufficient resistance to maintain the cooling fluid in the first chamber at the intermediate pressure, and the fluid inlet being located proximate the piston;

first valve means for selectively infusing pressurized control fluid into the second chamber such as to move the piston against the intermediate pressure of the cooling fluid in the first chamber and thereby move the cathode member axially away from the anode member;

second valve means for selectively discharging the control fluid from the second chamber such that the intermediate pressure of the cooling fluid in the first chamber moves the piston against the discharging control fluid in the second chamber and thereby moves the cathode member axially toward the anode member;

an end wall bounding the cylinder member at an end opposite the arc device and having therein a fluid passage receptive of the pressurized cooling fluid;

telescoping tubing affixed between the piston and the end wall such as to convey the pressurized cooling fluid from the fluid passage to the fluid inlet;

a flexible electrical cable connected between the cathode member and a source of arc current and located within the cylinder member such as to be cooled by fluid therein; and voltage determining means for measuring an arc voltage between the cathode member and the anode member, and control means communicating with the voltage determining means for selectively controlling the first valve and the second valve such as to continually adjust relative spacing between the cathode member and the anode member so as to maintain a predetermined arc voltage.

* * * * *